June 21, 1960 K. J. FAIRBANKS ET AL 2,941,459
PHOTOGRAPHIC FLIGHT ANALYSIS APPARATUS AND SYSTEM
Filed June 7, 1954 6 Sheets-Sheet 1

KARL J. FAIRBANKS &
ALFRED K. BOYD,
INVENTORS

BY Homer R. Montague
ATTORNEY

June 21, 1960  K. J. FAIRBANKS ET AL  2,941,459
PHOTOGRAPHIC FLIGHT ANALYSIS APPARATUS AND SYSTEM
Filed June 7, 1954  6 Sheets-Sheet 2

KARL J. FAIRBANKS &
ALFRED K. BOYD
INVENTORS,

BY Homer R. Montague
ATTORNEY

June 21, 1960 K. J. FAIRBANKS ET AL 2,941,459
PHOTOGRAPHIC FLIGHT ANALYSIS APPARATUS AND SYSTEM
Filed June 7, 1954 6 Sheets-Sheet 3

KARL J. FAIRBANKS &
ALFRED K. BOYD,
INVENTORS

Homer R. Montague
ATTORNEY

INVENTORS:
KARL J. FAIRBANKS &
ALFRED K. BOYD,
BY Homer R. Montague
ATTORNEY

Fig. 13

INVENTORS:
KARL J. FAIRBANKS &
ALFRED K. BOYD,

BY Homer R. Montague
ATTORNEY

United States Patent Office 2,941,459
Patented June 21, 1960

2,941,459
PHOTOGRAPHIC FLIGHT ANALYSIS APPARATUS AND SYSTEM

Karl J. Fairbanks and Alfred K. Boyd, New York, N.Y., assignors to Sherman Fairchild & Associates, Inc., a corporation of New York Filed June 7, 1954, Ser. No. 434,952

11 Claims. (Cl. 95—36)

This invention pertains to a system and apparatus for photographically recording the space and time coordinates of moving objects for the purpose of permitting analysis of factors such as altitude, trajectory, velocity, acceleration and the like, and in such a way that direct analysis as to many flight factors is possible without the necessity for converting the recorded data to other forms for analysis. While the term "moving objects" is intended as a broad definition of the field of application of the invention, it is especially designed for the analysis of flight paths such as the trajectories of aircraft, missiles or like bodies traveling in space at relatively high speeds.

Many proposals have been made for recording photographically the successive positions of such bodies. However, all such prior proposals of which we are aware have had serious difficulties which have prevented their widespread adoption. Thus, arrangements which involve the making of successive exposures on motion picture film or the like have the disadvantage that the body is seen in only one position on each frame; no comparative information as to positional changes between frames can be had without reducing the individual time and space coordinate data to some approximation of a complete time-space trajectory. Another objection to such apparatus is that tracking has been accomplished by moving the optical axis of the camera to keep it directed at the object, or more correctly toward a particular point or mark on such object. The result was that the object was distorted or foreshortened in many of the frames constituting a sequence, and the separate images could only be related to each other by relating each image to some fixed mark in the moving camera and relating that mark to azimuth scales for angular position.

Motion-picture type cameras, as just described, also require tracking in two directions; e.g., horizontally and vertically, whereas the present invention requires tracking only in the horizontal direction in the typical case, although the optical axis may be inclined at a fixed angle to the horizontal where the object is flying at an elevation above the camera. In the case in which the optical axis of the camera, such as a motion picture camera, is aimed directly at the object throughout the series, the aspect of the object changes considerably as the object approaches and recedes from the observer, and it is very difficult to detect from the resulting pictures a particular mark (say on the side of the plane), or to estimate the angular attitude of the craft. Additionally, the actual size of the recorded image will vary as the body approaches and recedes, whereas in the present invention the size of the image is constant regardless of the object's position in the total field of the camera lens.

Other proposed devices have attempted to reduce the necessity of tracking in more than one plane by successively exposing a horizontally wide field which is fairly limited in vertical height, and successively recording the position of an image in this one field. Such arrangements, however, require that the approximate trajectory of the object be pre-established and located somewhere between the top and bottom of the narrow dimension of the field, thus introducing the possibility that the actual path may be entirely outside the image area. Moreover, devices of this so-called "ribbon-frame" type, and indeed most if not all prior analyzing cameras, take their images on the basis of equal time steps between exposures, thus tending to group or crowd the data at one end of the series, in the case of an accelerating object.

The present invention records the position of an object at equally spaced positions along a field which is imaged in the camera by a fixed lens upon a fixed and dimensionally stable photographic element, so that the image of the object is always broadside (or at least does not vary in aspect as the series is recorded), and does not vary in size throughout the series. It follows that the information conveyed by the individual records forming the series is distributed along the flight path, and that the scale of the movement is constant. There is no piling up of data which occurs with constant time-spacing of the images, which results in a large mass of uselessly repetitious data respecting slowly changing positions of the body, while the points or images are too widely spaced when the object is moving rapidly.

In the case of high speed objects, tracking is necessarily relatively difficult. Errors are inevitable, even with the present system, since manual tracking depends upon human ability. According to the present invention, if such errors do occur, the space position of the object is nevertheless frozen in the recorded information, and accurate tracking can be done slowly and deliberately in the laboratory without the need of subsequent corrections. As long as a part of the image can be seen in the trajectory record of the invention, its position can be accurately measured with reference to its previous position in an earlier strip of the same series.

Another common defect of prior proposals of this general type is that they do not include features permitting precise correlation as between different observation positions along an extended flight path, or between observation points so located as to give three-dimensional information as to the trajectory.

It is a principal object of the present invention to provide a system and apparatus by which motion-path parameters can be obtained directly and speedily, and in each form that analysis can be undertaken with a precision comparable to that of photogrammetric methods, and with a minimum amount of computation or data conversion.

In connection with the above general object, it is a further object of the invention to provide photographic time and position recording apparatus by which an extended series of photographic records may be made upon a single plate or film, whereby comparison of the space and time relationships may be made visually if desired; at the same time, the entire record is of such size that positional information may be obtained at leisure and with great precision for any desired part or parts of the record.

A further object of the invention is to provide such an apparatus in which the position of the photographic plate or film remains accurately fixed with respect to the coordinate system of the flight path, the exposure of each successive portion of the film or plate being obtained without altering this fixed positional relationship. At the same time, the apparatus provides operational features which make possible the accurate tracking of even high-speed bodies, so that the desired complete succession of records can readily be obtained upon the plate.

A further object of the invention is to provide apparatus of this type in which precision timing indications are provided for each of the successive exposures, so that an accurate correlation of the time and space factors becomes an integral part of the original record.

Still another object is to provide a system for the interconnected control of a plurality of recording cameras of the type described above, to provide separate records for individual portions of an extended flight path, and such that the resulting records may readily be integrated to one another to provide an accurate picture of the parameters of the flight along such an extended path. Apparatus according to the invention can also be used to track and record a single object in two series projected to different points on a base line to give complete 3-dimensional coverage of the motion by triangulation methods.

The fact that the present invention permits images of constant size to be recorded, taken in connection with the use of precision optics and stable image recording plate or film, makes it possible to measure the distance between successive images with great accuracy. However, the advantage of this possibility can only be gained if equally accurate provision is made for recording the time instant of each exposure. Since the time required to stop the motion of a high speed time indicator is much shorter than that necessary to stop the motion of even a high speed craft or missile, the present invention provides a shutter which gives the proper exposure for both time recording and object image formation, and does so by mechanism which absolutely ensures simultaneity between the two records so made.

Another object is to provide a system of the above kind in which precision correlation may be had as between one or more flight path recorders, and one or more auxiliary photographic recorders, whose use will provide additional information for purpose of analysis. For example, where one or more flight path recorders are distributed along and parallel to a proposed flight path, to record the time and position data essentially with respect to one vertical plane, one of the auxiliary recorders may be used to record information as to sidewise deviation of the moving body or craft from the expected and intended flight path. Another auxiliary recorder may be mounted so as to view the flight instruments of the aircraft or missile travelling along the flight path, so that collateral information from such instruments may be obtained at precisely timed intervals which may be identified with respect to the times of position records made by the flight analyzer cameras from outside the body. The invention contemplates the use of novel remote control equipment which may operate over radio or other communication channels, to integrate the controls of such auxiliary recorders.

The above and other objects of the invention will best be understood from the following detailed specification of a preferred embodiment of the apparatus, and of the novel system, given herein by way of example, and taken in connection with the appended drawings, in which:

Figures 1, 2, 3:
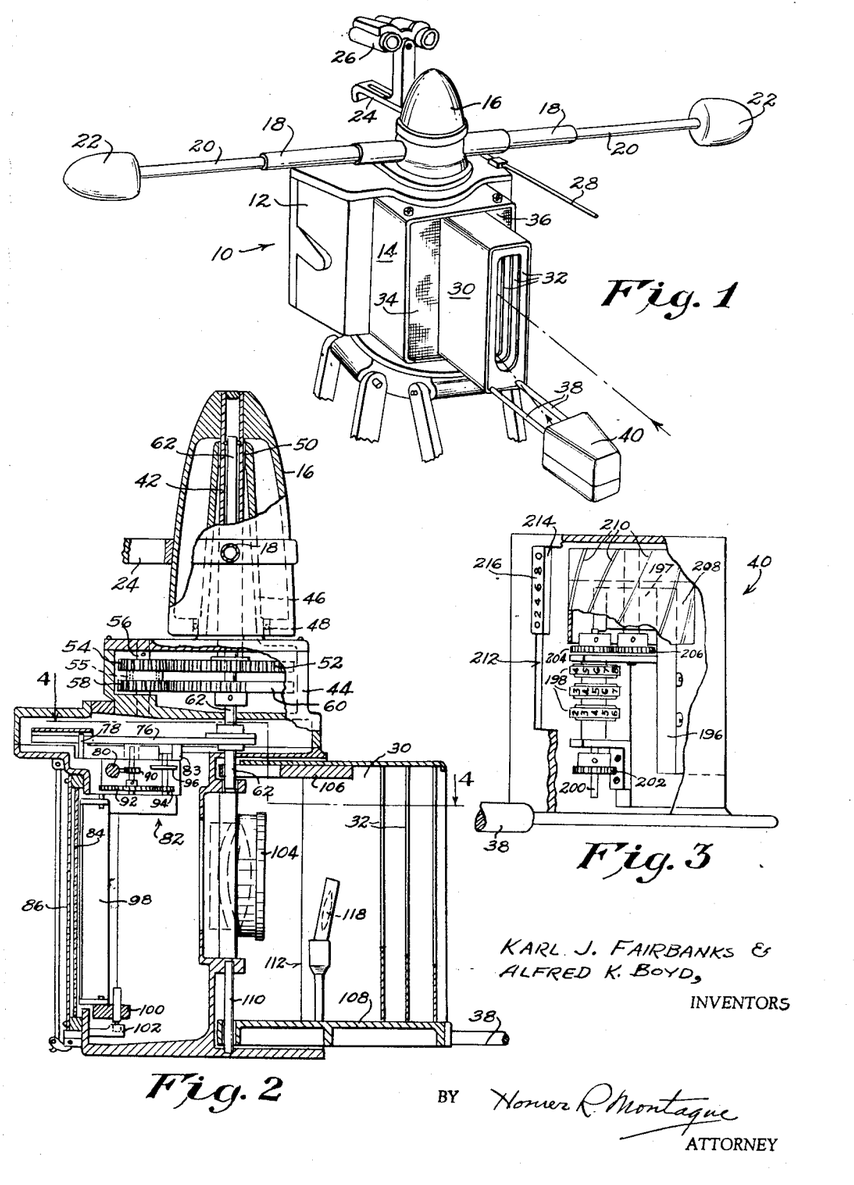
Fig. 1 is a perspective view of a complete camera unit of the apparatus in accordance with the invention.
Fig. 2 is a vertical sectional view of the camera shown in Fig. 1.
Fig. 3 is a three-quarter vertical elevational view of a timer indicating unit, parts being broken away to show the interior construction.

Turning now to Figs. 1 to 3 of the drawings, the major parts forming an analyzer camera in accordance with the invention are seen. These major parts will now be described, reference being made later to the more detailed figures of the drawing for an understanding of the essential structure of some of these parts. In Fig. 1, the analyzer camera is designated as a whole by numeral 10, and comprises a main body or housing 12 at the rear of which the photographic plate is held in the usual way. During use, the main housing, including its forward extension 14, remains in a fixed position with relation to the flight path to be investigated, and may conveniently be so mounted upon a fixed tripod support of conventional form.

Mounted for rotation upon the upper surface of housing 12 is a capstan 16 from which extend short sleeves 18, which serve as a convenient handgrip for swinging the capstan when tracking in azimuth to follow the path of a plane or missile passing along the flight path. Sleeves 18 also couple to the capstan the arms 20 carrying weighty enlargements 22 at their ends to add to the inertia of the rotating system to facilitate steady "panning" or motions in azimuth. For accurate tracking of the moving body, a support 24 extends rearwardly from capstan 16 and carries a pair of binoculars 26 provided with the usual reticles so that any desired point on the moving object can readily be kept accurately positioned with respect to the motions of the capstan, and, as will appear hereinafter, with respect to the position of a shutter within the camera. A gunsight telescope 28 is secured rigidly with respect to the housing 12, so that initial line-up of the camera with reference to any desired fiducial object in the field of view can be obtained. Ordinarily, the optical axis of the camera will be directed perpendicular to the vertical plane of the expected flight path. It may, however, also be used at predetermined angular settings and provide records which may later be rectified by photogrammetric methods.

Extending forwardly from the reduced width portion 14 of housing 10 is a light tunnel 30 mounted for rotation in a horizontal plane about the axis of capstan 16, and by connections to be described, this tunnel will be rotated along with the capstan during a part of the latter's rotation; specifically, during that part in which exposures are actually made. However, preceding and following this exposure interval, during which a succession of strips on the plate are exposed, there will normally be an "idle" movement of the capstan, during which the object being tracked will be followed by the operator through binoculars 26, but in which no strip exposures are made. This lead-in and lead-out feature ensures accurate tracking from the instant of the first strip exposure through the last such exposure, because the operator can commence tracking prior to the first exposure and get the capstan and associated parts in motion at the proper speed during the initial lead-in interval, and he need not worry about arriving at the mechanical end of his motion until after completion of the desired succession of strip exposures.

To prevent scattering of light inside the tunnel 30 and consequent fogging or deterioration of the images, the tunnel is lined with a series of baffles 32 dimensioned so that only the rays passing straight along said tunnel reach the exposure lens. Light-tightness is accomplished, despite the movement of the tunnel, by curtains 34, 36 secured to opposite side walls of the tunnel structure and wound upon spring rollers at opposite walls of the housing part 14, in a manner to be described below.

Figures 4, 10:
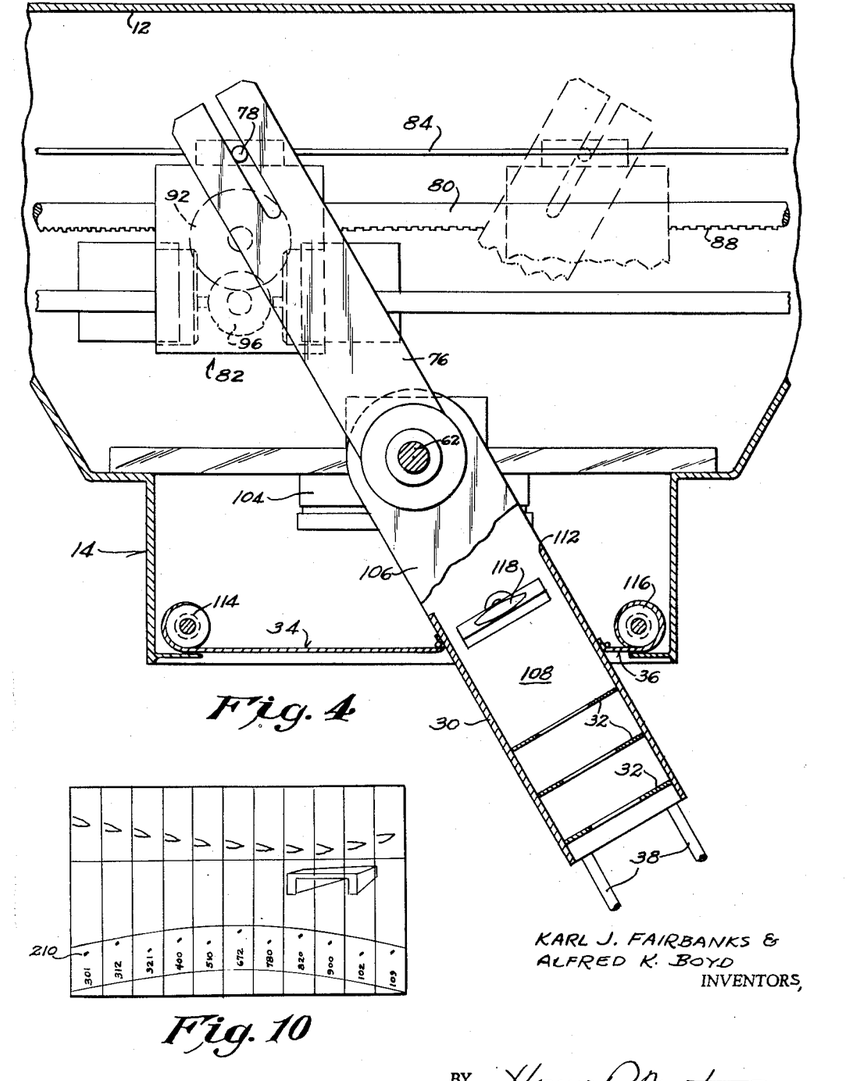
Fig. 4 is a fragmentary view in horizontal section, and taken to a larger scale, along the line 4—4 of Fig. 2.
Fig. 10 is a diagrammatic representation of the type of photographic record produced by the apparatus of the camera shown in the preceding figures.

Support rods 38 extend forwardly from the front tunnel 30, and carry at their outer ends a timer mechanism 40 whose indications are also exposed upon a part of each strip of the plate as it is exposed by the camera shutter. This timer is driven by a constant speed motor from a suitable power source, so that the timing indication appearing on each strip of the exposed plate will correspond accurately to the time that the moving body occupied the position shown on said strip. Fig. 10 of the drawings illustrates a typical plate produced by this apparatus, including the vertical strip exposures made at successive intervals, together with the timing indications for each strip. Since the plate and exposure lens remain stationary throughout the series of exposures, the stationary background of the plate corresponds to the picture that would be obtained by a simple ordinary exposure of the entire plate.

The arrangement of the parts of the camera is shown in more detail in Fig. 2 of the drawings, which is a vertical sectional view with certain parts broken away for clarity. In this figure, it will be seen that capstan 16 is integral with or secured to a sleeve 42 which extends downward into a gear housing 44 atop the main housing 12. From the top of gear housing 44 there extends a support boss 46 about which capstan 16 is journalled as by a bearing 48 at the bottom of the capstan, and a journal 50 between the boss and sleeve 42 near the upper end of the capstan. At its lower end, and within gear housing 44, sleeve 42 has secured thereto a gear 52 which meshes with a smaller gear 54. Gear 54 has a hub which is rigidly attached as by screws 55 to the hub of a mutilated gear 58, and both gears therefore rotate as a unit on a pilot shaft 56. This pilot shaft is held in fixed position as by a set screw (not shown) but can be rotated as by engaging a tool in its slotted end. The central portion of the shaft 56 is eccentric to the end portions by which the shaft is mounted in its support plates, such as the walls of gear housing 44, and the gears 54 and 58 rotate on this central portion. By rotating the shaft itself as described, all backlash can be eliminated between the small gears and the gears and segment with which they engage.

Figure 7:
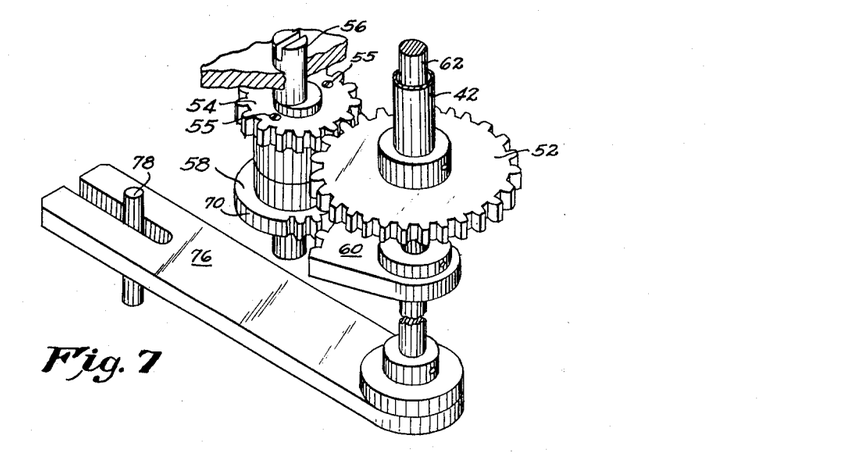
Fig. 7 is a diagrammatic perspective view illustrating the action of certain of the gears of Fig. 2.

From the above, it follows that any rotations of capstan 16 will be transmitted to gears 52 and 54. However, due to the structure of gear 58 and segment 60, only a portion of this rotation will be transmitted to segment 60 and shaft 62. This structure is better shown in Figs. 7, 8 and 9, to which reference will now be made. The mutilated gear 58 is provided with a toothed portion extending (in the example shown) around almost one-half of its periphery, and comprising in this example ten complete teeth. The remainder of the gear periphery is an untoothed surface 70 concentric with the pilot shaft 56 and having a radius equal to the pitch radius of the gear teeth. Segment 60 also has a toothed portion, encompassing in this example ten complete tooth spaces to receive the teeth of gear 58. At each end of this toothed portion, the outer envelope of the toothed portion is provided with a concave arcuate portion designated by numeral 72, and of a radius corresponding to the radius of portion 70 of the gear 58, formed for example by grinding away a portion of the teeth to the radius indicated by dash line 74 in Fig. 8. When this portion 70 enters the recesses 72, segment 60 is locked against rotation.

Figure 9:
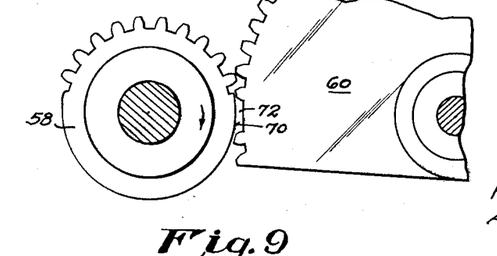
Fig. 9 is a similar but fragmentary view of the same gears in another relative position.

At the beginning of tracking, and in advance of the beginning of an exposure series, gear 58 will be rotating from a position counterclockwise to that shown in Fig. 9 and will turn freely in the direction of the arrow until it reaches the position shown in Fig. 9, at which time the teeth on gear 58 will pick up the teeth of segment 60 and portion 70 will leave the recess 72; the lead-in feature is accomplished by this arrangement.

Figure 8:
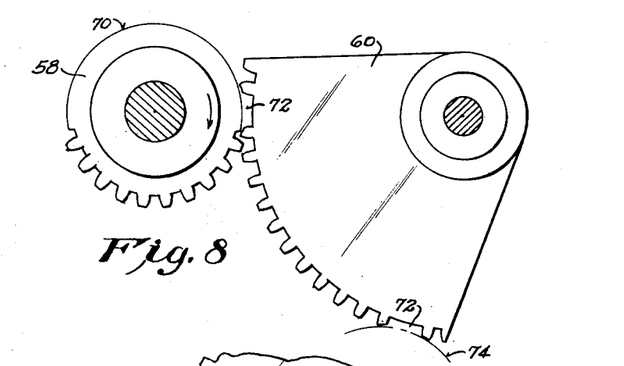
Fig. 8 is an enlarged plan view of two of the gears of Fig. 7 in one relative position.

With the parts in the position shown in Fig. 8, gear 58 has been driven by gear 52 through gear 54 to its maximum driving position in the direction of the arrow thereon, and the smooth peripheral portion 70 of gear 58 has entered the cut-out 72 of segment 60, locking segment 60 against further movement in its counter-clockwise direction. However, gear 58 is free to continue its movement in the direction of the arrow, without turning segment 60. Since gear 58 is free, gear 52 and sleeve 42 are also free, and it results that the operator may turn the capstan 16 to track the moving object freely after it has passed out of the field of view of the fixed camera, providing the desired lead-out feature.

It follows from the above that the operator can track the object for a period beginning in advance of the entry of the object into the exposure field, and following its travel outside the exposure field, but that segment 60 will be moved only during the portion of the tracking operation corresponding to movement of the object within the field of view of the camera. This motion of segment 60 is used to produce the desired series of strip exposures of the potographic plate or film by means now to be described. Obviously, with the arrangement shown, tracking in either direction in the field of view may be accomplished.

For photogrammetric accuracy in the finished plate or film, and assuming that the operator is properly tracking the object in the field of the binoculars, it is necessary that each strip of plate which is exposed correspond precisely to the instantaneous position of the object at the time of exposure. Since the tracking operation produces a rotation of sleeve 42 and hence of shaft 62 during the exposure period, it is necessary to move the focal-plane strip shutter across the plate or film in such a way that the position of the exposed strip on the plate corresponds to the sine of the angle swept out by the tracking rotation, as measured from the azimuth position corresponding to the optical axis of the camera lens. The aperture corresponding to each strip on the plate is defined by masking devices mounted on a carriage movable across the plane of the plate from one end to the other, and by curtains secured to said masking devices and extending across the portions of the plate area not directly behind the masking devices. A rotary slit-type shutter is also carried by the carriage for movement therewith, and is operated at intervals precisely related to the movement of the carriage during its traverse. To make this carriage move in the way necessary to satisfy the sine condition mentioned above, it is driven by a sine bar 76 fixed to segment 60 by driven shaft 62 (see Fig. 7) and extending rearwardly as best shown in Figs. 2 and 4. At its rearward end, the sine bar is slotted to receive an upstanding pin 78 affixed to the carriage assembly, which runs upon guides including a guide bar 80 extending adjacent and parallel to the sensitive plate. In this way, the position of the strip exposed at any one instant is made to correspond exactly to the position of the corresponding vertical strip portion of the exposure field being imaged by the camera lens, and within which the object being tracked will appear at the instant of that exposure. To insure against drift of the image, shaft 62 must pass vertically through the rear nodal center of the optical system and the center line of pin 78 must lie in the focal plane.

The carriage which supports the masking devices defining the exposure strip at the focal plane, and also supporting the rotary shutter, is designated generally by numeral 82 in Figs. 2 and 4, to which reference will now be made for explaining the general relationship of these parts. Carriage 82 is generally indicated in Fig. 2 as having an upper plate 83 and a lower plate 100, connected by vertical bars which extend upwardly and are secured to the top plate 83 as by screws. The entire carriage is mounted to slide on guide bar 80 for movement along and in front of the photographic plate 84, held in a conventional plate or film holder 86 at the rear of the housing 12. Bar 80 has a toothed rack 88 secured along its length with the teeth extending forwardly from the bar 80, as better shown in Fig. 4, and the teeth of the rack mesh with a pinion 90 mounted on the carriage structure by a shaft also carrying a gear 92 which in turn meshes with a pinion 94. On the shaft of pinion 94 is a cam 96 which, as carriage 82 moves along the bar 80, operates in sequence one or the other of a pair of shutter-controlling switches to be described below. The shutter itself is indicated in Fig. 2 by numeral 98, and extends vertically between the top and bottom plates of the carriage 82 and has its lower end carried by the bottom plate 100 suitably guided across the face of plate 84 as by a track 102.

The photographic lens for the camera is fixedly mounted within casing 12 as at 104, and it would image the entire field of view at the plane of photographic plate 84 except for the fact that tunnel 30 permits only light rays from approximately one desired vertical strip of the object space to pass into the lens. To move the tunnel in this way, it is carried by a bar 106 mounted for rotation by a downward extension of shaft 62. The top plate of the tunnel is secured to this bar 106, and its bottom plate 108 is similarly mounted upon a shaft 110 concentrically mounted with respect to shaft 62. In order to clear lens 104, the side walls of the tunnel do not extend all the way back to the lens plane, but terminate forwardly thereof as indicated in Fig. 2 at 112. Forwardly of this edge, the side walls of the tunnel (see now Fig. 4) are connected in a light-tight manner to the opaque flexible curtains 34 and 36 carried upon spring rollers 114, 116 mounted at the inside edges of the casing extension 14. Thus, only light passing along the baffled tunnel will enter lens 104, and the tunnel will follow the tracking movements of the capstan 16 and binoculars 26.

In order to image the timing indications of timer 40 in proper focus upon the plate 84, an auxiliary lens 118 is carried by the bottom plate of the tunnel 30, and together with camera lens 104, this lens 118 images the timer indications in proper position and focus at one end of each strip exposure as shown in the finished photograph record of Fig. 10.

In Fig. 4 of the drawings, the relationship of the parts is shown for a position corresponding to one end of the series of exposures; this figure illustrates how the tunnel 30 has its side walls cut away at 112 to clear the lens 104, and illustrates by dash lines the way in which carriage 82 is moved along support bar 80 by sine bar 76 during the exposure of the series of strips.

Figure 5:
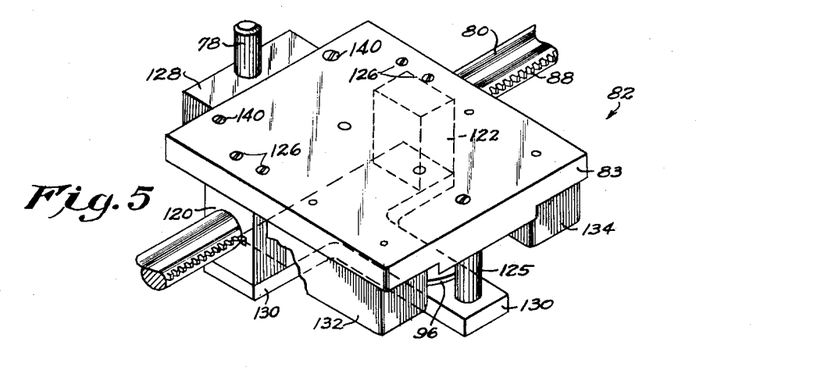
Fig. 5 is a perspective view of a switching assembly forming a part of the shutter carriage, also to a larger scale.
Figure 6:
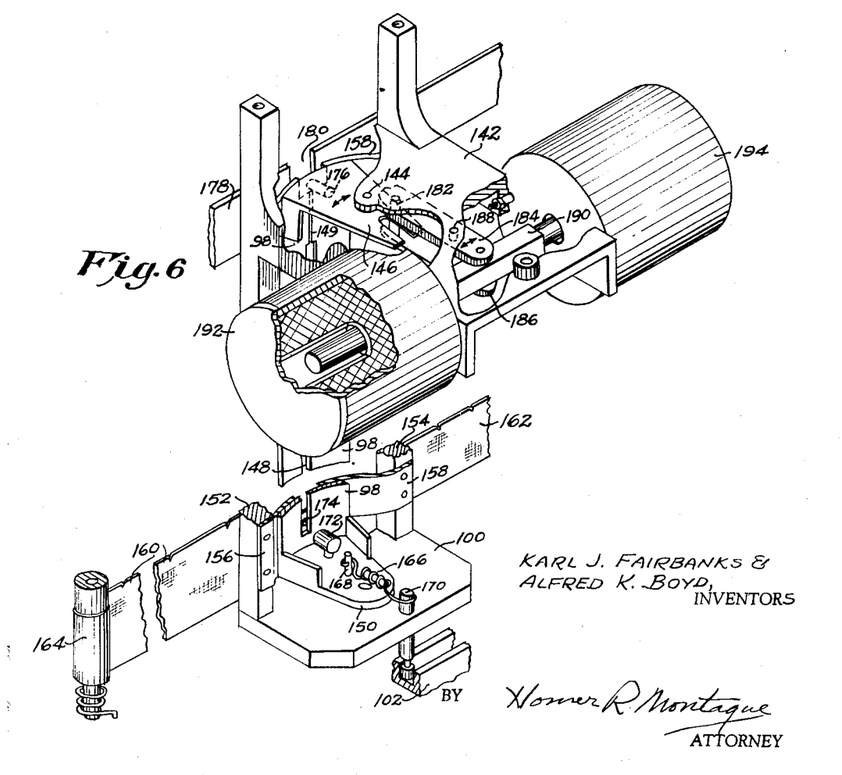
Fig. 6 is a diagrammatic perspective view, parts being broken away, of the remainder of the shutter carriage and shutter structure.

Turning now to Figs. 5 and 6, which may also be read together as a single exploded perspective view, with parts broken away to show internal structure, the carriage is again designated generally by numeral 82 and its top plate 83 is shown as slidably supported on bar 80 by journal blocks 120, 122 secured to the carriage top plate as by screws 126. A rearward extension 128 of the top plate carries the pin 78 by which the sine bar moves the carriage along its path. The lower faces of the journal blocks are secured to a T-shaped support plate 130 whose bar extends forwardly and parallel to the top plate 83, and between the bar and top plate 83 are journalled the carriage gears of Fig. 2. The forward end of the T-bar is supported from top plate 83 by a spacer bushing 125. A portion of cam 96 is shown in Fig. 5, the other gearing parts being omitted for clarity. The shutter-operating switches are indicated by numerals 132 and 134, and are secured beneath top plate 83 one on each side of cam 96; the switches may be conventional micro-switches provided with roller or plunger contact-operating elements engaged in succession by the lobe of cam 96 as it rotates in response to motion of the carriage along bar 80. Provision is preferably made for precise adjustment of the points of rotation of cam 96 at which each switch will be operated; in the embodiment shown, the switches are set so that one is operated upon each 180 degrees of rotation of the cam.

Referring now to Fig. 6, a horizontal channeled web plate 142 extends forwardly from the upward extensions of the carriage side bars. Pivoted on a vertical axis to this plate 142, as at 144, is the upper shutter-operating sector 146 from which depends the main shutter element 98, comprising a rather narrow section of a cylindrical shell concentric with pivot axis 144 and having a lengthwise slit 148 through which the exposure takes place as the element 98 is rapidly swung across an exposure aperture defined by parts also supported from the carriage. At its lower end, the shutter 98 is also supported by a sector indicated by 150 and pivoted concentrically with upper pivot 144 upon the lower carriage member 100. The lower carriage member is guided for movement with the upper by the track 102 which receives a pin or bearing stud projecting from plate member 100.

The lower carriage member or plate 100 is secured to the upper carriage portions and block 136 by the pair of spaced-apart vertical carriage bars 152, 154 extending between them. The upward extensions of these bars are connected to the top plate 83 as by screws 140. Each of the bars carries an aperture-defining opaque strip 156, 158 whose separation defines the width of the unit strip to be exposed at each exposure position of the carriage 82. To the bars 152 and 154 are also secured in light-tight fashion the flexible opaque curtains 160, 162 which prevent scattered light from reaching the photographic plate which lies directly behind the shutter assembly and the curtains. As in the case of the curtains of Fig. 4, curtains 160 and 162 are rolled up upon spring rollers one of which is indicated at numeral 164, and both lying at vertical edges of the photographic plate or beyond.

In order to bias the swinging shutter element 98 away from its central position (shown in Fig. 6) and keep it to one side or the other so that its slot 148 will not register with the exposure aperture until an exposure is to be made, a tension toggle spring 166 is connected from a pin 168 on the lower sector 150 to a fixed part or pin 170 on block 100. The spring 166 crosses the pivot axis of sector 150, and hence will tend to pull the sector to one side or the other of its centered position. Obviously, other spring bias arrangements could be provided for this purpose, and the arrangement could equally well be applied to the upper sector 146 or any other appropriate part of the shutter assembly.

It has been described above how the narrow shutter slot 148 flashes across the exposure aperture or wide slot defined between the inner edges of masking plates 156 and 158. In order to provide, on the finished photographic plate, a fiducial mark corresponding to center line of each exposure strip, sector 150 carries a miniature reticle projector and lamp unit 172 projecting through slit 148 and a small aperture 174 in a plate connecting the bottom edges of masking strips 156 and 158. Conveniently, these strips may in fact be formed as an integral masking element or frame. If the aperture 174 is centered beneath the exposure slot of the mask, a fiducial image of the reticle projector will be formed at the bottom center of each vertical strip of the final image plate.

If desired, an additional reticle projector 176 may be carried by the upper shutter sector to project through the shutter slit 148 a fiducial image which will be received by the photographic plate only at one position of the carriage, e.g. at the center of the plate adjacent the top edge, by reason of a mask strip 178 extending along the entire top edge of the plate and having only a single aperture or notch as at 180 corresponding to the position along the plate edge at which the indication is desired of, say, the position of the carriage relative to the plate at the instant of exposure of the central strip of the series. Equivalent arrangements for producing these fiducial marks upon the final plate will occur to those skilled in the photographic and optical arts.

In order to cause the shutter 98 to swing across the exposure aperture once for each time the carriage travels a distance equal to the width of the desired exposure strip, the upper sector is arranged to be swung on its axis, for example by a pin 182 engaged in the slotted tail of the sector, and carried between two parallel links 184, 186 pivoted upon the web 142 as at 188. The forward ends of these links are pivoted to a bar 190 whose opposite ends carry armatures or core elements cooperating with electromagnets 192, 194 secured to the depending side flanges of channeled web 142, so that upon energization of either magnet, the bar 190 will be pulled one way or the other to swing the shutter across the exposure aperture, where it will be held by spring 166 until the other magnet is energized. Preferably, the magnets are energized by a surge of current obtained from a storage capacitor (not shown) which is continuously recharged from the current supply source, so that maximum operating speed of the shutter can be obtained without imposing undue current requirements on said source. Such capacitor discharge arrangements are well known in the electrical shutter control field.

In a typical example of a camera embodying the above provisions, and using an 8½ inch horizontal length of plate (which may be a standard 8 by 10 inch photographic plate), the gearing was arranged so that 58 strips were obtained, each being about 0.147 inch wide, the width of the exposure aperture in the shutter masking plate. An effective shutter speed of about $\frac{1}{400}$ to $\frac{1}{1000}$ of a second or more can readily be obtained to prevent noticeable blurring of even the higher speed objects at normal ranges. While it is feasible to permit unlimited lead-in and lead-out tracking, with the gearing shown, it is preferred to provide about 60° of free angular motion at each end of the exposure interval. Successive operations in tracking across in one direction only can readily be accomplished by moving the capstan back to its original starting position while the shutter energizing circuit is disconnected. The shutter shown, the biasing spring to retain it in "closed" condition, not only facilitates this return motion, but prevents false exposures between energizations of the magnets under conditions when the camera must be tilted upward or downward substantially from its normal and approximately horizontal position.

The travelling slit shutter above described is to be distinguished from the well known travelling slit focal plane shutters which provide only a single full-frame exposure by the motion of an open slit across the entire width of a film or plate area. In the present invention, masking elements do in fact define such a travelling slit, but means are provided for maintaining the slit normally closed during movement of the parts, and opening it only periodically, in synchronized relation to the movement of the carriage, to make a plurality of successive adjacent individual strip exposures as described. The periodic opening phase of the slit shutter is, as stated made so short compared to the travel speed that an unblurred image is obtained at each strip, even though a moving object (and preferably a rapidly moving time indicator) will ordinarily be present in the imaged field.

In order to provide readable time indications for each strip exposure, and notwithstanding the high exposure speeds employed, the timer shown in Fig. 3 was developed. As stated, it is driven from a constant speed motor of any desired or convenient type. Referring to Fig. 3, the timer casing contains an upright support 196 upon which is carried the array of counter wheels 198 of the Veeder type arranged so that one rotation of the shaft 200 produces a change of 10 digits in the top counter wheel, and the middle wheel must rotate $\frac{1}{10}$ of a revolution or one digit for each revolution of the top wheel. The bottom wheel similarly rotates $\frac{1}{10}$ of a revolution for each revolution of the middle wheel. The drive to the counter may be from the constant speed motor (not shown) to the shaft gear 202. However, since the top wheel when driven to provide indications of hundredths of a second is moving at a very high rate, its images if driven to indicate one thousandth of a second would be so blurred even with the highest conceivable shutter speeds, that it is necessary to provide an additional means for indication of these shutter time intervals.

To solve this problem, the top wheel is driven at a speed such that its digits would indicate only hundredths of a second, and an auxiliary indicating device is provided for indications of thousandths of a second. The counter shaft carries a pinion 204 meshing with a pinion 206 whose shaft carries a drum 208 journalled on support 197, the periphery of the drum being marked with a plurality of helical white lines 210. The digits indicated by counter wheels 198 are exposed to the camera through an aperture 212 in the wall of the casing which faces the camera lens, and the white lines 210 pass behind a narrow slot 214 forming a continuation of the aperture 212. Hence, the rotation of drum 208 causes a spot of white to pass along the slot 214 each time the drum moves through an angle corresponding to the separation of the helical markings; this may be arranged to require $\frac{1}{100}$ of a second. A scale 216 is placed alongside slot 214, and the apparent position of the travelling white spot along this slot, as read against the scale 216, is photographed at the instant of each strip exposure. In this way, an accurately readable time for each strip, to within $\frac{1}{1000}$ of a second, can readily be obtained directly on the final plate, as in Fig. 10. If desired, a small lamp may be provided to illuminate the timer face to ensure adequate exposure regardless of external lighting conditions at the timer.

Even though the speed of movement of the shutter 98 across the exposure slit aperture is sufficiently great to stop the motion of a high speed object with reference to the photographic plate, it will not ordinarily be fast enough to stop the motion of timer drum 208 in cases where the time is to be indicated to $\frac{1}{1000}$ of a second. To provide greater motion-stopping ability for the shutter with respect to the timer drum rotation, but without introducing any possibility of an error in synchronism between the photographing of any strip and the corresponding timer indication, the portion of the shutter 98 which exposes the image of the timer may be formed with a slit 149 shown in Fig. 6 as considerably narrower in width than the main exposure slot 148. Thus, a single shutter 98 provides for the different exposure times required to stop the images of different elements all moving in the photographic field.

The shutter 98 has been shown and described as of the focal plane type, with an exposure slit cooperating with a travelling masking device which defines the exposure area of the plate for each operation of the shutter. While this is a convenient, efficient and generally advantageous arrangement, it is pointed out that with some lenses, or for other reasons, it may be desired to utilize a between-the-lens shutter as the exposure time control, the same being operated at intervals or pulsed just like the shutter 98. In such case, the travelling carriage will still carry the masking devices including strips 156, 158 to define the plate area exposed at each operation of the shutter.

The camera described above provides for the first time a photogrammetrically accurate record of high speed bodies in motion over extended flight paths, by a continuous series of exposures made upon a single medium each bearing a precise record of the relative time for each exposure. The record so obtained shows the vertical and one set of horizontal components of motion directly, and does not require data reduction to compensate for rotation of the line of sight during the series. With any given camera lens and horizontal distance to the flight path, however, only a given length of flight can be followed, and it is in many cases desired to make a record over a longer path than can accurately be covered by a single camera of practical size. Moreover, it is sometimes desired to make an additional or supplemental record of the horizontal deviations (generally along the line of sight of the camera) of the moving object from the intended or expected flight path, and this requires the use of an auxiliary camera, which may be of the motion-picture type, directed along the runway or flight path. In addition, it is often desired to correlate the strip exposures of the flight path analyzer camera with the instantaneous readings of flight instruments or the like within the moving craft or missile, and this requires a recording camera in the object itself. Both types of such auxiliary cameras should have their controls integrated with the instants of exposure of the strips in the analyzer camera or cameras, so that correlation can be made without unnecessary calculations or extrapolations.

Figure 11:
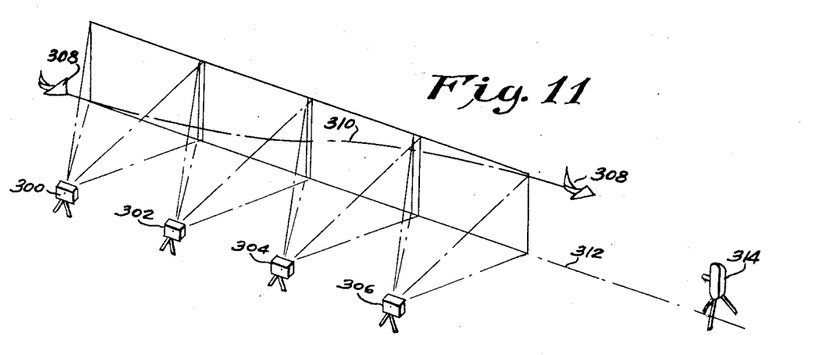
Fig. 11 is a perspective view illustrating the operation of an integrated system including several of the flight analysis cameras together with auxiliary cameras, shown during the recording of the flight path of an airplane.

The invention therefore also comprises a novel integrated control system for such auxiliary cameras, which will now be described in connection with Figs. 11 to 13 of the drawings. Referring first to Fig. 11, there is represented in perspective the arrangement of a series of four flight analyzer cameras 300, 302, 304 and 306, spaced apart along and parallel to an expected flight path of an airplane 308. Each of the cameras is of the type already described herein, and they are aligned with one another and so spaced that their fields of view overlap slightly along the flight path, as indicated by the dotted rectangles representing the fields of view of the cameras. The actual flight path of the airplane is indicated by the line 310. If this path should deviate horizontally from the common base line 312 of the four fields of view, this fact is readily observed by the camera 314 disposed at one end of the path on the base line 312 and directed along the flight path toward the airplane. This camera may be an ordinary motion picture camera, but is preferably one which will make successive single exposures on a strip of motion picture film, each exposure corresponding to the instant of exposure of one strip in one of the analyzer cameras 300 to 306.

Figure 12:
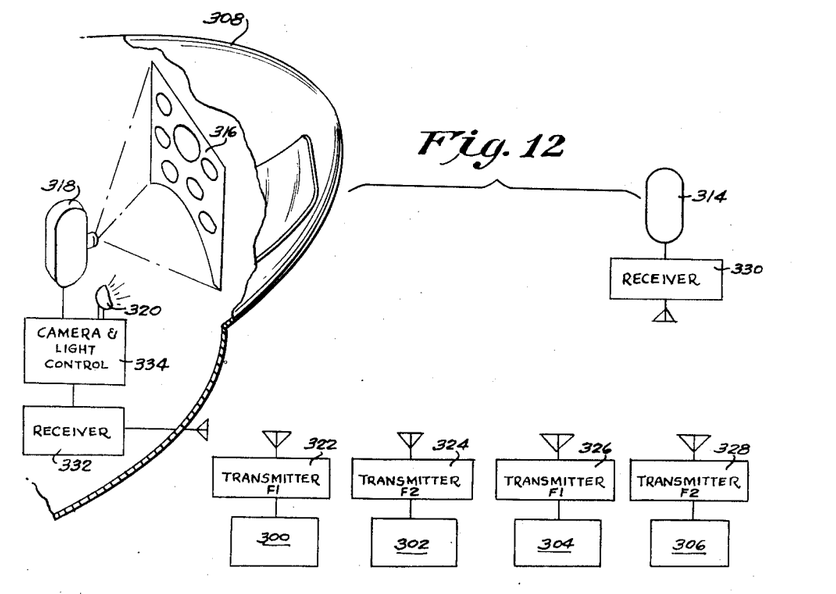
Fig. 12 is a schematic block diagram of the inter-related control of a system of the Fig. 11 type by means of radio.

In Fig. 12, the four analyzer cameras are again indicated by the same numerals, as is the auxiliary camera 314. In addition, this figure shows a broken-away portion of the cockpit of the plane 308, including its instrument panel 316, this showing being intended to be typical of any instruments whose readings should be recorded during the flight across the field of view of the analyzer cameras. Within the plane is mounted another successive single-frame camera of the motion picture type, designated 318, arranged to record the indications of such of the instruments as are desired. While the light by which the exposures within the cockpit are made may be that generally supplied in such locations, the present system comprehends the use of an auxiliary light 320 which may be of the high-speed flash type, the arrangement being such that while the conventional camera mechanism may open the shutter for an exposure of ordinary motion-picture speed, the lamp 320 will be flashed during the shutter-open condition to make in fact a high-speed record of the instantaneous meter indications. Such an arrangement will permit accurate recording even of instruments whose readings may be changing very rapidly, for example in the case of high speed missiles or the like.

To illustrate the type of interrelated control which is provided by the invention, each of the four cameras 300 to 306 is shown as connected to a radio transmitter capable of emitting a pulse of radio energy each time the camera makes a strip exposure. Conveniently, the transmitters (numbered 322, 324, 326 and 328 respectively) can be pulsed (or controlled to emit a pulse), at the time of each exposure in the corresponding camera, by the same switches employed to energize the solenoids of the camera shutters. The details of this part of the control arrangement may be varied widely within the spirit of the invention.

As shown in Fig. 12, the transmitter 322 will emit pulses of a carrier frequency F1, and the next transmitter 324 will emit pulses of frequency F2. Also, transmitter 326 will emit on frequency F1, and finally transmitter 328 on F2. These transmitters will control the instants of exposure of the auxiliary cameras 314 and 318, and since different operators will be manipulating the cameras 300 to 306, and since the flight-path fields of view cannot practically be made precisely shoulder-to-shoulder, nor overlapped by precisely a single exposure strip, it is essential that the exposures made by the auxiliary cameras be controlled exclusively by the first analyzer camera until it has completed its series, whereupon control of the auxiliary cameras must be shifted to the second analyzer camera, and so on. It is for this reason that separate frequencies are used for the successive analyzer camera transmitters, and a special form of two-channel selective lock-out receiver is used at each auxiliary camera. This receiver, which may be identical for the two auxiliary cameras 314 and 318 shown in the drawings, will be described in more detail below. For the present, it is sufficient to state that it responds to produce an operative output under the control of the first camera, on frequency F1, until the receipt of the first pulse of frequency F2 from the second camera. Thereafter, and even if pulses of F1 should continue to be received for a period due to excessive overlap of the analyzer camera fields of view, the receiver will respond only to pulses of the frequency F2. However, after the expiration of the said period, and when the third analyzer camera begins tracking the object and emitting pulses of F1, the first such pulse will again condition the receiver to respond only to these pulses, and so on. In this way, control of the auxiliary cameras is passed from each analyzer camera to the next in turn, and the auxiliary cameras make their exposures in timed relation to the instants in which the object is actually being recorded by a particular analyzer camera. This is accomplished with the use of only two radio carrier frequencies, with consequent simplification in equipment and band requirements where several analyzer cameras are required.

The radio receiver controlling auxiliary camera 314 is designated 330, and that controlling camera 318 and lamp 320 is designated 332. These receivers may be identical, and their novel features are shown in Fig. 13 and described below. However, in the case of camera 318 and 320, a control unit 334 is illustrated between the receiver and camera, this being the equipment which initiates the operation of the camera film advance and shutter opening, and the operation of high-speed lamp 320 at the proper instant while the shutter is open. Thus, shutter opening may be initiated automatically a short interval after receipt of each carrier pulse, and the lamp may actually be flashed coincidentally with receipt of the following pulse, the shutter remaining open for this time. In this way, exact synchronism may be obtained between the analyzer camera exposures and the instrument recorder camera.

The transmitters 322 to 328 may be conventional radio transmitters tuned to the respective frequencies indicated, and capable of emitting a short pulse of the appropriate carrier for each exposure made in the corresponding analyzer camera; as stated above, for instance, under control of the micro-switch contacts which control the focal plane strip shutters. Since the transmitter circuits are not in themselves novel, they are not detailed herein, but can readily be provided by anyone skilled in the radio art.

The receiver of the system is, however, novel, and in combination with the other elements of the system, represents an important contribution to the problem of control where the element of passing control from one transmitter to another, without overlap or ambiguity, is necessary. The receiver itself is illustrated in more detail in Fig. 13, to which reference is now made. Again, block portions suitably labelled have been used to show elements themselves well known in the art.

Figure 13:
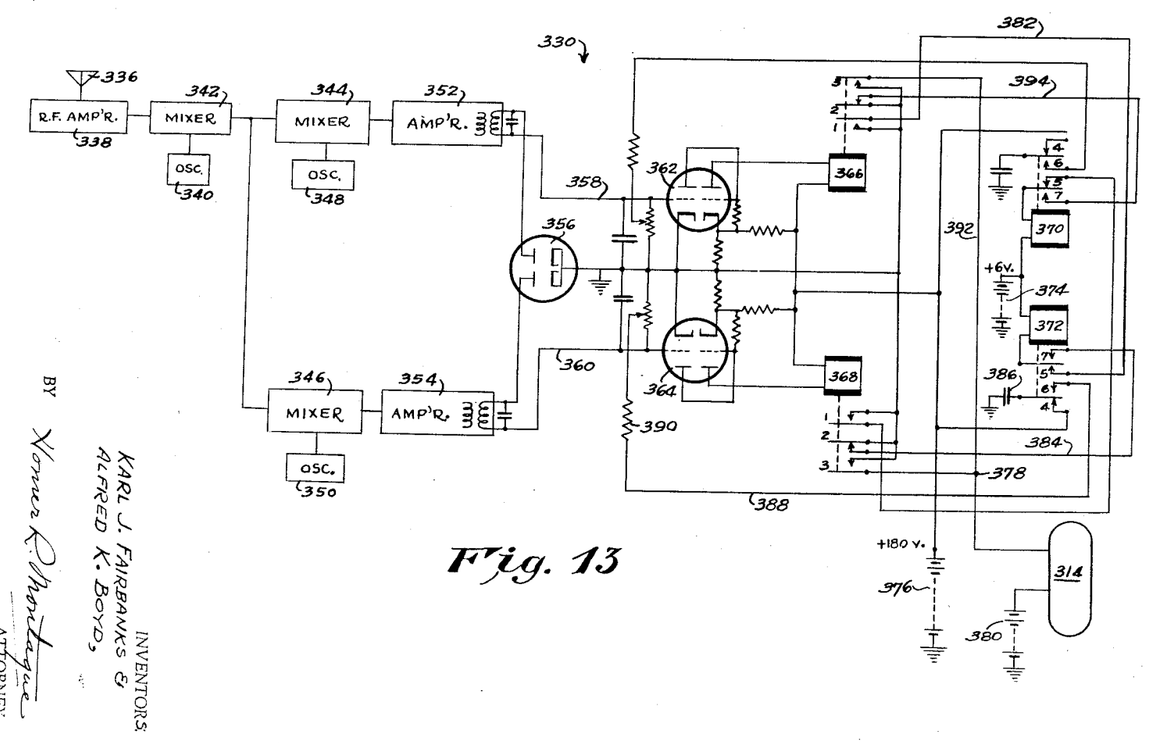
Fig. 13 is a schematic diagram of one form of control receiver forming a part of the Fig. 12 system.

Referring to Fig. 13, numeral 336 designates a conventional receiving antenna, connected to a radio frequency amplifier 338 capable of amplifying both carrier frequencies F1 and F2. Solely by way of example, the receiver is shown as including a first local oscillator 340 and mixer stage 342 to provide a first intermediate frequency which is applied to second mixer stages 344 and 346 and there mixed with signals from separate local oscillators 348 and 350 to provide separate second intermediate frequencies amplified by amplifiers 352 and 354 and applied to the dual detector tube 356. Appropriate tuned circuits and filters will be supplied in this portion of the receiver in accordance with well known practices of the radio art, to provide separate detected outputs at leads 358, 360 for the control of the respective final amplifier stages 362 and 364.

Output stage 362 is of the direct coupled type, the signal derived from carrier F1 being applied to the grid electrode of its first triode section, and the anode of the first triode section being directly coupled to the grid electrode of the second triode section. The same applies to the second output stage 364, but in this case of course the control signal is present only when carrier F2 is being received. The anode-cathode load impedance for each of the output stages comprises the operating coil of a relay, relay 366 pertaining to the amplifier 362, and relay 368 to the amplifier 364. Since the relays are identical, the same numerals are used for their contact sets, contact sets 1 and 3 of each relay being normally open (when the corresponding relay coil is not energized), and contact set 2 of each relay being normally closed. In addition, there are two output control relays 370 and 372 having their coils connected to a direct current source indicated by the battery 374, which may be a 6-volt dry battery. The anode supply source for tubes 362 and 364 is indicated by battery 376, and the negative terminals of both batteries are connected together, as to a common ground.

Each of the output relays 370 and 372 has a pair of moving contacts which rest normally against back contacts 4 and 5 when the relays are not energized. Here again, since these two relays are identical, the same contact numerals have been applied to the corresponding contacts of both relays. An output terminal common to both output circuits is indicated at terminal 378, and when current from the source 380 (which again may be a dry battery) flows through the control equipment of one of the auxiliary cameras, indicated in Fig. 13 as camera 314, an exposure is made by that camera.

The operation of the receiver will now be described. Upon receipt of a carrier pulse of either frequency, the same will be amplified and detected by the earlier stages of the receiver in a known manner, and if of frequency F1 the signal will pass through amplifier 352 to detector 356, and positive potential charge will be applied over lead 358 to the gird of the first section of amplifier 362. The increased anode-cathode current in this first section raises the potential of the grid electrode of the second triode section with reference to ground, increasing the space current in the second triode section of tube 362 and energizing the coil of relay 366, closing contacts 1 and 3 thereof, and opening contacts 2. Contacts 1 complete a circuit from ground over lead 382 to the closed contacts 5 of relay 372, through its operating coil and the current source 374. This relay therefore operates, and while the opening of contacts 5 would interrupt the circuit through its coil, the coil circuit is kept operated by a stick circuit 384 over contacts 7, now closed, and the normally closed contacts 2 of relay 368 and to ground. Upon operation of relay 372 as just described, its contacts 6 close and complete a circuit from a storage capacitor 386 and lead 388, through resistor 390 to the grid bias resistor of the first triode section of amplifier 364. This bias resistor is tapped so that a sufficiently high positive potential at the tap will oppose any rise in the potential of the grid of the section due to signal arriving over lead 360, and effectively block off the amplifier 364. The positive potential is applied to lead 388 from the condenser 386, which, just prior to the operation of relay 372, was charged to positive 180 volts from source 376 over the normally closed contacts 4. The period during which amplifier 364 cannot be producing an output, even though signal is arriving over lead 360, is determined by the value of capacitor 386 and resistor 390 over which it discharges its charge, and is selected so that amplifier 364 is disabled for the duration of several normal pulses from any analyzer transmitter; in other words, for a time greater than that corresponding to the greatest expected overlap between photographing operations by successive analyzer cameras.

Returning to the point at which relay 366 was first operated by an incoming pulse of frequency F1, its normally open contacts 3 were also closed, and completed a circuit from ground over these contacts and lead 392, common output control terminal 378, camera 314 controls, source 380 and back to ground, to cause one exposure by this camera and any other camera connected in a similar way to terminal 378. Upon cessation of the signal on lead 358 (at the end of the first pulse of frequency F1), relay 366 will release, but output relay 372 will remain operated because of its stick circuit. Thus, successive pulses of frequency F1 will cause successive exposures by camera 314, at least until arrival of the first pulse of frequency F2.

When the first pulse of frequency F2 arrives at the receiver, it is heterodyned and detected as before, but now the second IF channel is energized, and detector 356 applies signal to the grid of the first section of the amplifier 364. The disabling of this amplifier by the charge on capacitor 386 has long since terminated, due to discharge of said capacitor through resistor 390; the original charge was not replenished because relay 372 has remained operated during the entire succession of F1 pulses. As in the prior case, however, amplifier 364 energizes relay 368 and causes it to operate its contacts, closing contacts 1 and 3 and opening contacts 2. The opening of these latter contacts 2 of course immediately breaks the stick circuit for relay 372, which will become de-energized at once and break the stick circuit in a second place, namely at its contacts 7. At the same time, capacitor 368 will be re-charged to 180 volts positive by contacts 4, in preparation for the start of the next series of F1 pulses.

In the same way as described in the case of relay 366, the operation of relay 368 closes its contacts 1 and completes an operating circuit for the coil of relay 370 over normally closed contacts 5 of the latter, and relay 370 is held operated by a stick circuit including its contacts 7, lead 394, contacts 2 of relay 366, now de-energized and ground. Also, contacts 3 of relay 368 complete the operating circuit to terminal 378 and the camera 314.

It will be seen from the above that the relays are connected in a flip-flop arrangement such that after a pulse series has commenced, one of these relays is always operated and the other is non-operated. Hence, and since the operation of one of these relays necessarily disables the amplifier supplying the other, at least for the possible period of overlapping pulses, it results that when the first pulse is received of a kind different from those just preceding, absolute control of the output circuit to camera 314 is seized by the new pulse series, even though overlapping pulses of the orignal sort continue to arrive for a period determined by the time constant of capacitor 386 and resistor 390.

Inasmuch as the components connecting relays 366, 368, 370 and 372 are perfectly symmetrical, it is considered unnecessary to describe further these connections and the operations by which control is transferred back to the F1 pulses after completion of the series of F2 pulses. While the circuit has been described with reference to a particular arrangement of amplifiers and relays arranged in a particular interlocked or flip-flop circuit, it is to be understood that various substitutions may be made within the skill of the worker in the electrical and electronic arts.

The particular form of camera which has been described herein has been shown as intended for what might be called "manual" tracking of the moving object; that is, the tracking movements of capstan 16 and the parts driven thereby are produced by a human operator as a result of his maintaining a sighting device aimed accurately at the object or a point thereon during the operation. The remote control system described has also been treated as it would be used in connection with such manual tracking. However, the same results will be obtained if the tracking is accomplished by known automatic systems so long as the condition is fulfilled and the control element corresponding to the capstan 16 or parts governed thereby is made to move in such a way as to follow the craft or missile being investigated. Thus, photo-electric tracking systems or radar tracking systems which are well known to the art may be arranged to control the normal camera in a manner fully equivalent to the manual system described herein.

From the foregoing description, it will be seen that the invention satisfies all of its objects in the provision of an improved flight analysis camera structure utilizing a moving focal-plane shutter to expose successive strips in the desired way, as well as in the provisions of an improved and novel control system by which the operations of one or more of such cameras, with associated equipment, may be correlated with auxiliary course or instrument cameras of types themselves known; taken together, these improvements provide an entirely new precision to the study of the motions of high speed bodies, craft, missiles and the like. Therefore, it is to be understood that the invention is not to be considered as limited to the details of construction and operation set forth herein in detail by way of example, but that the implementation of the inventive concepts may be varied widely without departing from the spirit of the invention as defined in the appended claims.

What is claimed is:

1. In a motion analyzing camera, means for mounting a photographic element, a lens positioned to project toward said element the entire image constituting a predetermined field of view, a masking element movable adjacent the plane of said photographic element and having an aperture dimensioned to expose the entire width of said photographic element in one direction by only a narrow strip thereof as measured in the perpendicular direction, means for moving said masking element in a plane parallel to and adjacent said photographic element in accordance with the movement of an object across said field of view, a shutter movable with said masking element, and means for operating said shutter in timed relation to movement of said masking element for exposing to said field of view successive portions of said photographic element during the movement of said masking element thereacross.

2. In a motion analyzing camera, a casing, a photographic element secured in said casing, a lens for imaging at the plane of said element a predetermined field of view, a carriage mounted for movement in a plane parallel to the plane of said element from end to end thereof, masking devices supported by said carriage defining a strip-like exposure area progressing across said element during movement of said carriage, a rotary slotted shutter mounted on said carriage adjacent said masking devices to make successive instantaneous exposures of the strip areas at spaced positions of said carriage, and means for operating said shutter at predetermined successive positions of said carriage.

3. In a motion analyzing camera, a casing, a photographic element secured in said casing, a lens for imaging at the plane of said element a predetermined field of view, a carriage mounted for movement in a plane parallel to the plane of said element from end to end thereof, masking devices supported by said carriage defining a strip-like exposure area progressing across said element during movement of said carriage, shutter means on said carriage for sequentially exposing to rays passing said lens successive strips of said element defined by said masking devices, and means for operating said shutter means in timed relation to the movement of said carriage through successive equal distances.

4. In a motion analyzing camera, a casing, a photographic element secured in said casing, a lens for imaging at the plane of said element a predetermined field of view, a carriage mounted for movement in a plane parallel to the plane of said element from end to end thereof, masking devices supported by said carriage defining a strip-like exposure area progressing across said element during movement of said carriage, shutter means on said carriage for sequentially exposing to rays passing said lens successive strips of said element defined by said masking devices, a rack mounted adjacent said photographic element and extending thereacross, a pinion on said carriage engaging said rack, a cam driven by said pinion during movement of said carriage, and means controlled by said cam for operating said shutter means to produce successive exposures at times corresponding to equal increments of the distance travelled by said carriage.

5. In a motion analyzing camera, a support for securing a photographic element in a plane, a lens for projecting a field of view upon said plane, means including a travelling slit shutter for sequentially exposing parallel strips of said element through said lens, movable optical sighting means mounted on said camera and linked to the first-named means to control its travel precisely in accordance with the motion of said sighting means, and means for opening and closing said shutter in synchronized relation to said travel.

6. A motion analyzing camera in accordance with claim 5, including a light-tunnel movably mounted forwardly of the lens on said camera for rotation about a nodal point of said lens to restrict light entering said lens to a narrow beam, and means connecting said tunnel to said movable optical sighting means for movement therewith.

7. A motion analyzing camera in accordance with claim 6, including a timing indicator mounted on the forward end of said light tunnel for exposure through said lens onto each of the parallel strips of said element in sequence.

8. In a motion analyzing camera, a support for securing a photographic element substantially in a plane, a lens for projecting a field of view upon said plane, a carriage movable across and adjacent said plane, optical tracking means on said camera for moving said carriage in accordance with the position of a moving object tracked by said tracking means, a shutter on said carriage for exposing successive strips of said element to light from said lens, and lost-motion means for connecting said tracking means to said carriage to move the latter during a portion only of the tracking motion of said tracking means.

9. A motion analyzing variable traverse rate camera giving successive strip exposures, comprising a housing, means for securing a photographic plate in said housing, a lens fixedly carried in said housing in position to project upon the format of said plate a predetermined field of view, a carriage mounted to travel adjacent the face of said element from end to end thereof, masking means on said carriage defining a slit aperture extending perpendicular to the carriage movement, a shutter on said carriage for opening and closing the slit aperture, means connected to said carriage for occluding the plate surface except that portion exposed through the slit and shutter, and means under control of the carriage movement for periodically opening and closing said shutter to make successive adjacent strip exposures on the plate as the carriage is traversed, and regardless of the variation in the traverse rate thereof.

10. In a motion analyzing variable traverse rate camera of the successive slit exposure type, a housing, a lens on the housing, means for securing a photographic plate in the housing for exposure to substantially the entire field of view of said lens, a capstan on said housing rotatable about an axis perpendicular to the axis of said lens and passing substantially through its rear nodal point, a sighting device secured to the capstan for rotating with the latter, a carriage slidably mounted within the housing to travel across and adjacent the plane of a plate secured in the housing, a slit mask on said carriage, a slit occluding shutter on said carriage, means connecting said capstan to said carriage to traverse the latter across the plate in synchronized relation to an object in space being tracked by the rotation of said sighting device, and means connected between said housing and said carriage to open said shutter momentarily during successive equal increments of motion of said carriage, regardless of changes in the velocity of such object.

11. In the art of making a flight path photographic record of the successive positions of a moving object, the steps of tracking such an object from a fixed viewpoint throughout an extended range of its motion; making successive photographic exposures of said object, upon a single fixed photographic medium, during a portion only of said range; and controlling the exposure succession in accordance with the tracking displacement to provide successive such exposures for equal increments of movement of the object's image on said medium.

References Cited in the file of this patent

UNITED STATES PATENTS

| | | |
|---|---|---|
| 1,444,365 | Bowes | Feb. 6, 1923 |
| 1,779,853 | Paulus et al. | Oct. 28, 1930 |
| 1,782,860 | Reipert | Nov. 25, 1930 |
| 2,338,657 | Mihalyi | Jan. 4, 1944 |
| 2,385,254 | Bludworth | Sept. 18, 1945 |
| 2,394,287 | Bludworth | Feb. 5, 1946 |
| 2,420,339 | Rabinow | May 13, 1947 |
| 2,460,163 | Bowen | Jan. 25, 1949 |
| 2,462,150 | Wilkinson | Feb. 22, 1949 |
| 2,587,018 | Weisfeldt | Feb. 26, 1952 |
| 2,641,523 | Beckman et al. | June 9, 1953 |
| 2,649,015 | Nassour | Aug. 18, 1953 |
| 2,653,507 | Riles et al. | Sept. 29, 1953 |
| 2,683,071 | Pearle | July 6, 1954 |
| 2,791,165 | Hoyt | May 7, 1957 |

FOREIGN PATENTS

| | | |
|---|---|---|
| 734,755 | Germany | Apr. 22, 1943 |